United States Patent
Berger et al.

(10) Patent No.: US 7,297,220 B2
(45) Date of Patent: Nov. 20, 2007

(54) METHOD AND DEVICE FOR THE PRODUCTION OF CURVED THREAD-REINFORCED TUBULAR STRUCTURES

(75) Inventors: Markus Berger, Sehnde (DE); Rainer Oehl, Hannover (DE); Klaus Binder, Sarstedt (DE)

(73) Assignee: Contitech Luftfedersysteme GmbH

( * ) Notice: Subject to any disclaimer, the term of this patent is extended or adjusted under 35 U.S.C. 154(b) by 504 days.

(21) Appl. No.: 10/807,407

(22) Filed: Mar. 24, 2004

(65) Prior Publication Data

US 2004/0211508 A1 Oct. 28, 2004

(30) Foreign Application Priority Data

Apr. 24, 2003 (DE) ................................. 103 18 545

(51) Int. Cl.
B65H 81/00 (2006.01)
(52) U.S. Cl. .................. 156/173; 156/244.14; 156/431
(58) Field of Classification Search ................ 156/173, 156/175, 407, 457, 148, 117, 397, 431, 432
See application file for complete search history.

(56) References Cited

U.S. PATENT DOCUMENTS 3,606,921 A * 9/1971 Grawey ...................... 152/453
4,119,748 A * 10/1978 Verbauwhede et al. .... 428/34.5
4,917,318 A * 4/1990 Schlake et al. .......... 242/437.1

FOREIGN PATENT DOCUMENTS

| DE | 196 14 476 A1 | 10/1997 |
| DE | 198 46 852 C2 | 7/2001 |
| EP | 0 285 726 B1 | 10/1988 |

* cited by examiner

Primary Examiner—Geoffrey L. Knable

(57) ABSTRACT

A method for the production of curved thread-reinforced tubular structures composed of rubber layers and of strengthening layers and an accompanying device. In one aspect, the method includes the application of a first rubber layer to the circumference of mandrels driven forward in a feed direction (X) and winding on of a multiplicity of parallel reinforcing threads, having defined thread angles ($\alpha$) with respect to the feed axis (x), by means of a bobbin creel, to form a first thread ply. The mandrels are led through a rotating deflection element surrounding the mandrels and the reinforcing threads are guided so as to be distributed on the inner circumference. An application of a covering rubber layer may be performed (after the optionally multiple execution of the previous steps, alone or in combination). The mandrels are led through the deflection element of the bobbin creel eccentrically in the region of the deflection element.

13 Claims, 2 Drawing Sheets

METHOD AND DEVICE FOR THE PRODUCTION OF CURVED THREAD-REINFORCED TUBULAR STRUCTURES

BACKGROUND OF THE INVENTION

1. Field of the Invention

The invention relates to a method for the production of curved thread-reinforced tubular structures and a device for such production.

2. Background Description

Curved thread-reinforced tubular structures may be used in automobile applications such as, for example, pneumatic springs of motor vehicles. A generic production method and device for curved thread-reinforced tubular structures are known, for example, from DE 25 45 058 C3. In this case, mandrels are guided concentrically by the axis of rotation of a deflection element, so that a constant thread angle, distributed over the circumference, is ensured.

To improve the pneumatic spring properties of the tubular structures, it is known from DE 196 14 476 A1 and EP 0 285 726 B1 to vary the thread angle over the length of the pneumatic springs. Due to the varied thread angle in the axial direction of the pneumatic spring bellows, the latter has a differing outside diameter according to the thread angle, so that the rolling behavior and the air pressures can be adapted to the respective requirements involved in the installation and operation of the pneumatic spring bellows in a pneumatic spring.

The winding of reinforcing threads on to mandrels guided in a feed direction, with a rubber layer extruded on them, is known, for example, from DE 198 46 852 C2. In this case, the reinforcing threads are guided in a deflection element on the inner circumference of the deflection element with a very small gap with respect to the mandrel. The reinforcing threads are guided to the outer circumference of the mandrel or of the rubber layer located on it by means of guides distributed equidistantly on the inner circumference of the deflection element. In this situation, the deflection element rotates at a speed corresponding to a required thread angle with respect to the feed direction.

When, for example, the pneumatic springs are installed in vehicles, the installation situation is sometimes so unfavorable that curved pneumatic springs have to be used. Curved tubular structures are conventionally produced by straight thread-reinforced tubular portions being prestressed into a curved shape and then vulcanized. Such a method is described, for example, in DE 25 45 058 C3. One disadvantage, however, is that the run of the reinforcing threads during production is not adapted to the curved shape. During prestressing, a displacement of the reinforcing threads which is detrimental to the quality of the final product then sometimes occurs. Moreover, only a complete curvature of the tubular portion is possible, but not the production of selected curved regions.

SUMMARY OF THE INVENTION

The invention provides a method and a device for production of curved thread-reinforced tubular structures composed of rubber layers and of strengthening layers, so that it is possible to generate curved portions at low outlay during a continuous production process.

In one aspect, the invention includes the steps:
application of a first rubber layer to the circumference of mandrels driven forward in a feed direction (X);
winding on of a multiplicity of parallel reinforcing threads, having defined thread angles with respect to the feed axis, by means of a bobbin creel, to form a first thread ply, the mandrels being guided by a rotating deflection element surrounding the mandrels and guiding the reinforcing threads so as to be distributed on the inner circumference;
application of a covering rubber layer after the optionally multiple execution of the previous steps, alone or together; and
leading the mandrels through the deflection element of the bobbin creel eccentrically in the region of the deflection element.

In another aspect of the invention, the method includes, for example,
leading at least one mandrel through a deflection element of a bobbin creel in a feed direction, offset from a central longitudinal axis of the deflection element; and
winding a multiplicity of parallel reinforcing threads on the at least one mandrel as the mandrel is led through the deflection element resulting in defined thread angles ($\alpha$) with respect to a feed axis to form a tubular structure having a curvature.

BRIEF DESCRIPTION OF THE DRAWINGS

The foregoing and objects, aspects and advantages will be better understood from the following detailed description of embodiments of the invention with reference to the drawings, in which.

DETAILED DESCRIPTION OF EMBODIMENTS OF THE INVENTION

Figure 1:
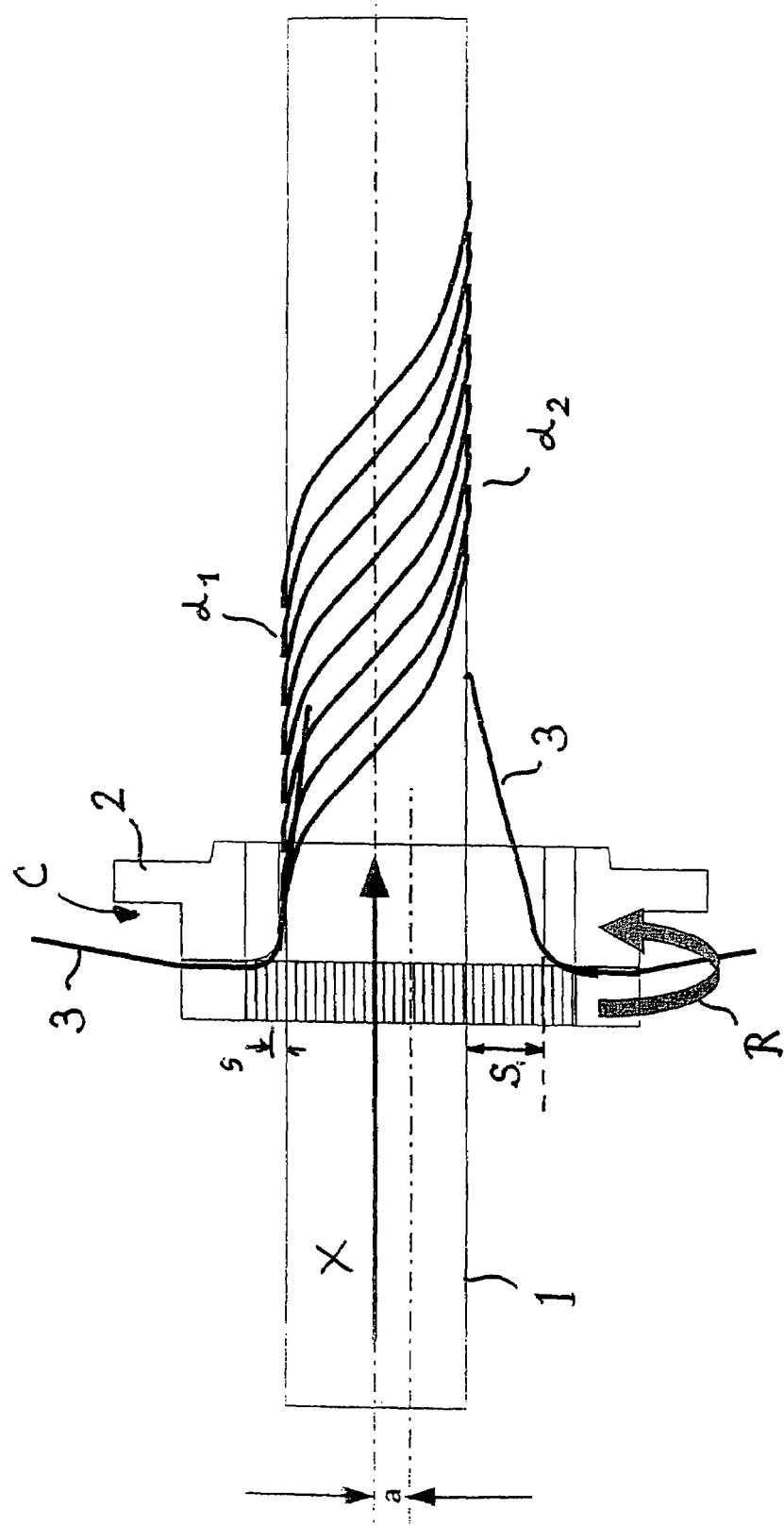
FIG. 1 shows a device for the production of curved thread-reinforced tubular structures with an eccentric lead through of a mandrel through a deflection element.

The invention relates to a method for the production of curved thread-reinforced tubular structures and a device for such production. In one implementation, the tubular structure is composed of rubber layers and of strengthening layers. In one aspect of the invention, thread-reinforced tubular structures made in accordance with the invention may be used, for example, as pneumatic spring bellows for pneumatic springs of motor vehicles. In this type of application, the thread-reinforced tubular structures contain a multiplicity of reinforcing threads which lie closely next to one another at equidistant intervals, in order to be capable of withstanding the high pressure of the pneumatic spring.

In contrast to the conventional concentric lead through of the mandrels through the deflection element and to the resulting equal thread angles over the circumference, an eccentric lead through of the mandrels through the deflection element is provided herein. That is, in the invention mandrels are guided eccentrically or offset from a central longitudinal axis through a deflection element of a bobbin creel in the region of the deflection element. For this purpose, the inside diameter of the deflection element is correspondingly larger than the diameter of the mandrel covered with at least one rubber layer.

In one aspect of the invention, the thread angle corresponds directly to the distance of the deflection element from the mandrel, so that, when the mandrels are led through eccentrically, different thread angles are produced over the circumference of the mandrels. By contrast, the thread angles of a respective circumferential position remain the same over the length of the mandrels.

Due to the different thread angles over the circumference, the tubular structure undergoes a curvature which is established automatically after the thread-reinforced tubular structure has been drawn off from the mandrels and after subsequent vulcanization. Advantageously, therefore, it is necessary merely to lead 5 the mandrels through the deflection element eccentrically, in order to produce curved tube-like structures, without further steps, such as the conventional required bending of the structures being necessary before vulcanization. Moreover, the advantage of the method according to the invention is that, by a variation of the eccentric lead through and, if appropriate, centric lead through in part regions, selected portions of the tubular structure can be provided with defined curvatures during the continuous production process.

For the eccentric lead through of the mandrels through the rotating deflection element, either the guide of the mandrels may be displaced transversally to the feed direction about a position shifted with respect to the concentric lead through of the mandrels through the deflection element. Alternatively or additionally to this, the deflection element, together with the bobbin creel, may also be displaced transversely to the feed direction from a position shifted with respect to the concentric lead through of the mandrels through the deflection element. In this case, displacement may take place in the horizontal and/or the vertical direction.

The invention is achieved, furthermore, by means of the device for the production of curved thread-reinforced tubular structures by guide means for guiding the mandrels eccentrically through the deflection element of the bobbin creel in the region of the deflection element. In the device, at least one bobbin creel which has a rotatable deflection element surrounds mandrels capable of being driven forward in a feed direction and which guides reinforcing threads so as to be distributed on the inner circumference.

So, either of the guide means of the device may cooperate with the mandrels, in order to displace the mandrels transversally to the feed direction about a position shifted with respect to the concentric lead through of the mandrels through the deflection element. Additionally or alternatively to this, the guide means may also cooperate with the bobbin creel, in order to displace the bobbin creel transversally to the feed direction about a position shifted with respect to the concentric lead through of the mandrels through the deflection element.

FIG. 1 illustrates a detail of a device according to the invention for the production of curved thread-reinforced tubular structures, in which one or more plies of rubber layers and of strengthening layers in the form of thread contextures are applied to a mandrel 1. The rubber layers are applied to the mandrel and/or a thread ply, for example, by extrusion in a known manner.

The mandrels 1 are advanced in a continuous process in a feed direction X through successively arranged extrusion devices for applying the rubber layers and bobbin creels for applying the thread plies. The bobbin creels generally shown at "C", in this aspect, have a deflection element 2 which rotates in the direction of rotation R and by means of which reinforcing threads 3 are applied to the mandrel 1 at a thread angle α with respect to the feed direction X. The thread angle α is dependent on the feed speed of the mandrel 1 and on the gap S between the inner circumference of the deflection element 2 and the adjacent outer circumference of the mandrel 1.

According to the invention, in this case, the mandrel 1 is led through the deflection element 2 so as to be offset eccentrically by the amount of a distance "a" from the axis of rotation of the deflection element 2. The result of this is that the reinforcing threads 3 are applied in the circumferential region of the mandrel 1 having the smaller gap S at a thread angle $\alpha_1$ other than in the circumferential region of the mandrel 1 having the larger gap $S_1$. However, during constant displacement of the mandrel 1 about the axis of rotation at the distance "a", for each circumferential region the thread angle a remains the same over the length of the mandrel 1.

During the production of the thread-reinforced tubular structures, the eccentric displacement "a" may be adapted in any desired way. Also, part regions having the same thread angle α may also be provided over the circumference by the mandrel 1 being led centrically through the deflection element 2. Complicated curved shapes of the thread-reinforced tubular structure can thereby be produced.

Due to the different thread angles α over the circumference of the thread-reinforced tubular structure, under pressure a curved shape is formed in such a way that a small radius is obtained in the region of the smaller thread angles $\alpha_1$ and a large radius is obtained in the region of the large thread angles $\alpha_2$.

Figure 2:
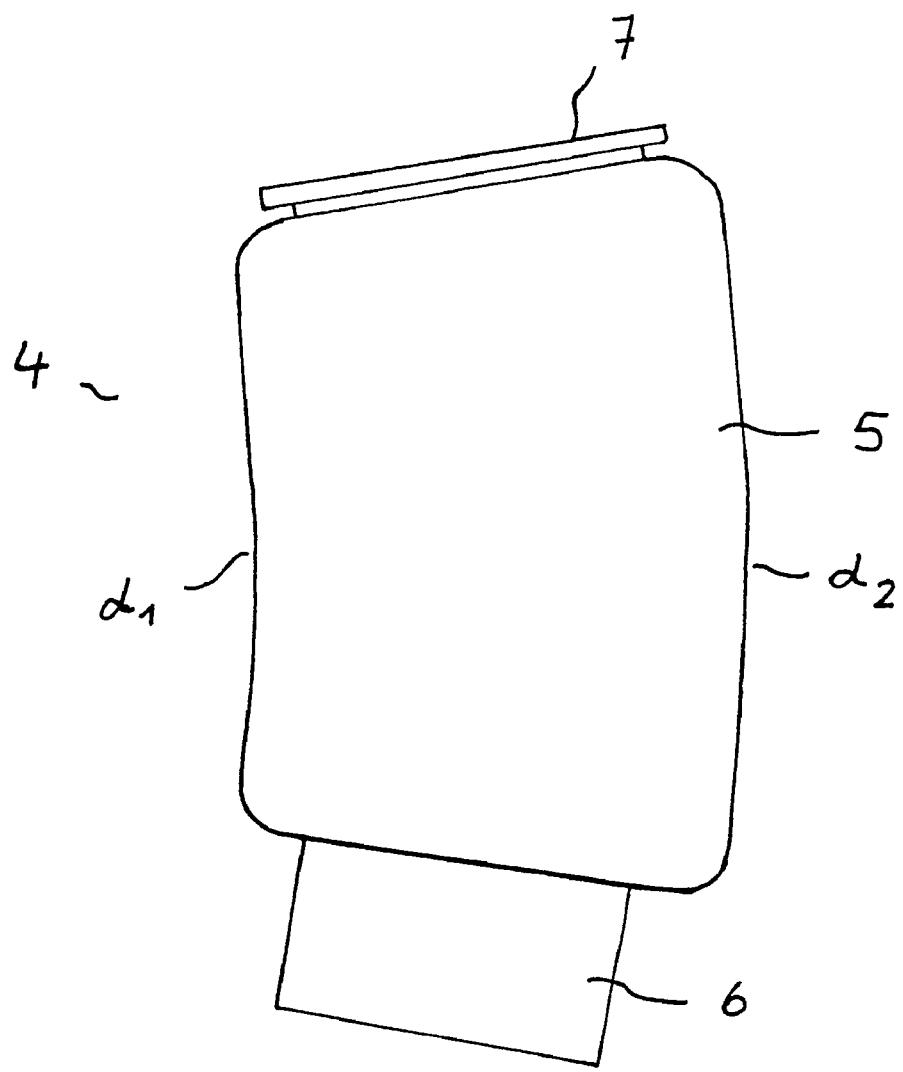
FIG. 2 shows a curved pneumatic spring with curved pneumatic spring bellows.

FIG. 2 illustrates a curved pneumatic spring 4 with a pneumatic spring bellows 5 which is drawn over a piston 6 and a cover 7. The curved shape of the pneumatic spring bellows 5 is imparted in that the thread angle α of the reinforcing threads 3 is different, distributed over the circumference. Thus, the thread angle $\alpha_1$ in the region of the smaller radius on the left-hand side is smaller than the thread angle $\alpha_2$ on the right-hand side having the larger radius.

Pneumatic springs 4 of this type may also be used in installation situations where, for example because of the cardanic axle mounting of the pistons, a curved shape of the pneumatic springs 4 is necessary. The resulting concertina widths between the pneumatic spring bellows 5 and the piston 6 are optimally designed for the corresponding cardanic axle mounting by virtue of the adaptation of the thread angles by means of the method according to the invention, so that the useful life of the pneumatic springs 4 is increased. Moreover, curved pneumatic springs 4 can be adapted more effectively to the confined construction spaces in vehicles, and the dynamic properties and therefore the driving properties of a vehicle can be improved.

While the invention has been described in terms of preferred embodiments, those skilled in the art will recognize that the invention can be practiced with modification within the spirit and scope of the appended claims.

The invention claimed is:

1. A method for production of curved thread-reinforced tubular structures composed of rubber layers and of strengthening layers, comprising the steps of:
    applying a first rubber layer to a circumference of an essentially cylindrical mandrel driven forward in a feed direction (X) coinciding with the cylinder axis of the mandrel;
    winding on a multiplicity of parallel reinforcing threads, having defined thread angles (α) with respect to the feed direction, by means of a bobbin creel, to form a first thread ply, the mandrel being led through a rotating deflection element having an inner circumference with a diameter greater than the diameter of the mandrel, the inner circumference surrounding the mandrel and guiding the reinforcing threads which are distributed along the inner circumference;

applying a covering rubber layer, wherein the mandrel is led through the deflection element of the bobbin creel and the cylinder axis of the mandrel is offset with respect to the axis of rotation of the deflection element, the axis of rotation and the cylinder axis being parallel to each other.

2. The method as claimed in claim 1, further comprising a preceding step of displacing a guide of the mandrel transversally to the feed direction (X) to a position ln which the cylinder axis of the mandrel is shifted with respect to the axis of rotation of the deflection element.

3. The method as claimed in claim 1, further comprising a preceding step of displacing the deflection element, together with the bobbin creel, transversely to the feed direction (X) to a position in which the axis of rotation of the deflection element is shifted with respect to the cylinder axis of the mandrel.

4. The method as claimed in claim 1, wherein the applying the covering of the rubber layer is provided after multiple execution of at least one of the applying a first rubber layer and the winding steps.

5. A method for production of curved thread-reinforced tubular structures, comprising the steps of:

leading at least one essentially cylindrical mandrel through a deflection element of a bobbin creel in a feed direction coinciding with the cylinder axis of the at least one mandrel, the deflection element having an inner circumference With a center axis offset from the cylinder axis of the at least one mandrel; and winding a multiplicity of parallel reinforcing threads on the at least one mandrel as the mandrel is led through the deflection element resulting in defined thread angles ($\alpha$) with respect to the feed direction to form a tubular structure having a curvature, wherein:

a smaller gap between the outer circumference of the at least one mandrel and the inner circumference of the deflection element results in smaller thread angles $\alpha_1$;

a larger gap between the outer circumference of the at least one mandrel and the inner circumference of the deflection element results in larger thread angles $\alpha_2$; and a small radius of the curvature is obtained in a region of the smaller thread angles $\alpha_1$ and a large radius of the curvature is obtained in a region of the larger thread angles $\alpha_2$.

6. The method as claimed in claim 5, further comprising the steps of:

applying a rubber layer to a circumference of the at least one mandrel driven forward in the feed direction (X); and applying a covering rubber layer to the rubber layer.

7. The method as claimed in claim 5, wherein the thread angles correspond directly to a distance of the inner circumference of the deflection element from the at least one mandrel so that when the at least one mandrel is led through the deflection element different thread angles are produced over a circumference of the at least one mandrel.

8. The method as claimed in claim 5, wherein the winding on a multiplicity of parallel reinforcing threads forms a tubular structure which automatically undergoes a curvature after the multiplicity of parallel reinforcing threads are drawn off from the at least one mandrel.

9. The method as claimed in claim 5, further comprising varying the offset of the cylinder axis with respect to the center axis at selected portions to define curvatures of a resultant tubular structure.

10. The method as claimed in claim 9, further comprising varying the position of the cylinder axis of the at least one mandrel at selected portions to be concentric with the center axis of the inner circumference of the deflection element.

11. The method as claimed in claim 5, wherein the offset of the center axis from the cylinder axis is provided by at least one of:

displacing guides of the at least one mandrel transversally to the feed direction to a position where the cylinder axis of the at least one mandrel is shifted with respect to center axis of the inner circumference of the deflection element; and displacing the deflection element, together with the bobbin creel, transversely to the feed direction to a position where the center axis is shifted with respect to the cylinder axis of the at least one mandrel.

12. The method as claimed in claim 5, wherein the at least one mandrel is advanced in a continuous process in a feed direction (X) through successively arranged extrusion devices.

13. The method as claimed in claim 5, wherein the thread angles are dependent on a feed speed of the at least one mandrel and a gap between the inner circumference of the deflection element and an adjacent outer circumference of the at least one mandrel.

* * * * *